(12) United States Patent
Mountney et al.

(10) Patent No.: US 9,990,716 B2
(45) Date of Patent: Jun. 5, 2018

(54) METHODS FOR VISUALIZING HEART SCAR TISSUE

(71) Applicant: Siemens Healthcare GmbH, Erlangen (DE)

(72) Inventors: Peter Mountney, London (GB);
Sabrina Reiml, Oberviechtach (DE);
Daniel Toth, Twickenham (GB);
Alexander Brost, Erlangen (DE);
Maria Panayiotou, London (GB);
Kawal Rhode, Croydon (GB)

(73) Assignee: Siemens Healthcare GmbH, Erlangen (DE)

( * ) Notice: Subject to any disclaimer, the term of this patent is extended or adjusted under 35 U.S.C. 154(b) by 0 days. days.

(21) Appl. No.: 15/419,197

(22) Filed: Jan. 30, 2017

(65) Prior Publication Data

US 2017/0221205 A1    Aug. 3, 2017

(30) Foreign Application Priority Data

Feb. 1, 2016    (GB) .................................. 1601747.7

(51) Int. Cl.
| | | |
|---|---|---|
| *G06K 9/00* | (2006.01) | |
| *G06T 7/00* | (2017.01) | |
| *G06T 7/70* | (2017.01) | |
| *G06T 19/00* | (2011.01) | |

(52) U.S. Cl.
CPC .............. *G06T 7/0012* (2013.01); *G06T 7/70* (2017.01); *G06T 19/00* (2013.01); *G06T 2207/10088* (2013.01); *G06T 2207/30048* (2013.01); *G06T 2210/41* (2013.01)

(58) Field of Classification Search
CPC ......... G06T 7/0012; G06T 2207/30041; G06T 2207/10101; G06K 9/0061; G06K 9/4661; G06K 9/00617; A61B 3/0025; A61B 3/102
USPC ........................................................ 382/131
See application file for complete search history.

(56) References Cited

U.S. PATENT DOCUMENTS

| | | | | |
|---|---|---|---|---|
| 6,110,459 | A * | 8/2000 | Mickle .................. | A61K 35/34 424/85.1 |
| 9,782,439 | B2 * | 10/2017 | Nagaya ................. | A61K 35/28 |
| 2015/0206302 | A1 | 7/2015 | Chen | |
| 2016/0140739 | A1 | 5/2016 | Sakuragi | |
| 2016/0166556 | A1 * | 6/2016 | Budas ................ | A61K 31/4439 514/341 |

* cited by examiner

*Primary Examiner* — Gregory F Cunningham
(74) *Attorney, Agent, or Firm* — Schiff Hardin LLP

(57) ABSTRACT

In a method for visualization of scar tissue in medical imaging data of a heart, medical imaging data representing a heart myocardium and scar tissue within the heart myocardium are obtained and provided to a computer. The computer deviates the thickness of the myocardium into a number of layers and calculates the presence and distribution of scar tissue within each of the layers. The scar tissue is shown in a visualization of the myocardium; and a user is provided with controls to allow the user to select which of the layers of scar tissue is visualised.

4 Claims, 6 Drawing Sheets

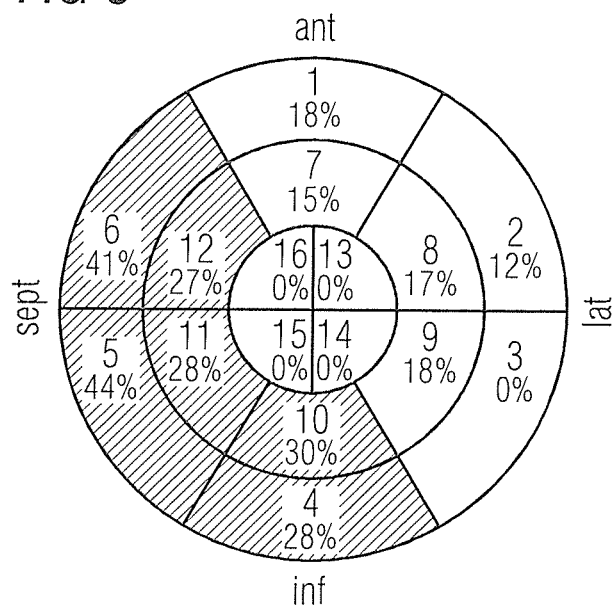

METHODS FOR VISUALIZING HEART SCAR TISSUE

BACKGROUND OF THE INVENTION

Field of the Invention

The present invention relates to methods for visualization of heart scar tissue.

Description of the Prior Art

In certain therapeutic and diagnostic methods, such as for the implantation of cardiac resynchronization therapy (CRT) devices, information about heart scar tissue is essential for the placement of the left ventricular (LV) lead. This information should not only include the location, but also the transmurality of scar, as both affect the effectiveness of CRT. It is then necessary to attach one or more electrodes to the heart to enable measurement or monitoring. The electrodes should preferably not be attached to a region of the heart wall composed of scar tissue, although acceptable contact may be achieved even with scar tissue present, if that scar tissue is on the inner surface of the wall, rather than the outer surface, where the electrode is to be attached.

FIG. 1 shows a representation of a wall of a left ventricle of a heart in short-axis view as captured in MRI imaging, and FIG. 2 schematically illustrates the heart wall in Long Axis view: the myocardium 10, which extends between an outer surface 16, the epicardium, to an inner surface 18, the endocardium with regions 12 of scar tissue illustrated. Electrode 14 should preferably be attached to the external surface 16 of the heart wall 10 at a region where no scar tissue is present. It is also acceptable to attach an electrode to the external surface 16 of the heart wall 10 at a region where scar tissue is present on the outer surface, although scar tissue may be present nearer an internal surface 18 of the heart wall, such as in region 12a. Conversely, regions such as 12b, where scar tissue is present at the outer surface 16, but for a limited depth, may be used for attachment of an electrode.

It is thus important for a clinician to be able to know not only whether scar tissue is present at a part of the heart wall, but its depth and its position within the thickness of the wall. The depth and its position within the thickness of the wall may be referred to as the "transmurality".

In one conventional method, late-gadolinium-enhanced (LGE) magnetic resonance imaging (MRI) is used to obtain pre-implant images that provide information about the location and transmurality of scar. However, the assessment is mostly manual, as tools for assessment are not yet widespread. In particular, the assessment of the transmurality is difficult and mostly performed by considering a short-axis view of the left ventricle obtained by MRI, see FIG. 1.

Some computer-implemented tools for assessment are known, and these focus only on simple representation of scar tissue distribution, for example the bull's-eye plot shown in FIG. 3. In FIG. 3, the bull's-eye plot represents an "unfolded" view of the myocardium around one heart chamber.

In this example, the myocardium is divided into sixteen regions 1-16. The region furthest from the apex is divided into six regions 1-6; the region nearer the apex is divided into a further six regions 7-12, while the region around the apex is divided into a further four regions 13-16. The shading applied on the bull's-eye plot of FIG. 3 represents regions of scar tissue. It is a projection of the scar in the myocardium to the epicardium. It is called scar distribution. Here, regions 6, 5, 11, 12 can be seen to comprise scar tissue over most of their respective surfaces. Most other wall regions show some scar tissue. Region 3 is shown as practically free of scar tissue, and may represent an acceptable site for attachment of an electrode, even though some scar tissue is present at, or near, the internal wall surface.

FIG. 4 represents some automated analysis of the bull's-eye plot of FIG. 3. Region 5 is shaded, since is it measured to comprise scar tissue over more than 50% of its surface, and so to be unsuitable for attachment of an electrode. The remaining regions each comprise scar tissue over less than 50% of their surface. This measurement may be known as "scar burden".

FIG. 5 represents the results of a calculation of transmurality, based on the data of FIG. 3. Regions 4, 5, 6, 10, 11, 12 are shown shaded since the scar tissue in these regions extends to more than 25% of the wall thickness. Those regions may accordingly be deemed unsuitable for attachment of an electrode.

While the above bull's-eye plot type representation of FIGS. 3-5 provides some relevant information, it remains difficult for a clinician to interpret the results, as only coarse information is presented and there is no location of the position of the scar tissue within the thickness of the wall in any region.

The approaches mentioned before either rely heavily on manual interaction or provide only coarse information. The review of the segmentation in the 2-D short axis representation of FIG. 1 is cumbersome and time consuming for a physician as it is necessary to scroll through many slices of image data. The bull's-eye plot representations of FIGS. 3-5 provide only coarse information, which may be insufficient to perform a good assessment of the underlying condition of the patient.

JP2015029518A discloses a method and arrangement for displaying a representation of different tissue types, particularly imaging the head: where the tissue types essentially consist of skin, blood vessels beneath the skin, bone, blood vessels beneath the bone, and brain tissue.

JP2015029518A describes obtaining 3D image information regarding the location of tissue types (e.g. blood vessels) in lower layers (under the skin and under the bone), then representing features from those layers on the image of the upper layers, or actually projected onto the skin itself. The combined presentation of such imagery requires the layers to be made transparent.

JP2015029518A provides projection of all anatomical tissue types to one of these (i.e. the skin). This projection results in a 2D visualization of all the tissue types and overlapping parts are identifiable. JP2015029518A requires a transparent modelling of the different tissue types, that they can be distinguished in the 2D projection based visualization.

SUMMARY OF THE INVENTION

An object of the invention is to provide an improved method for visualization of scar tissue within a heart.

The present invention provides a method to display a representation of scar tissue in the myocardium, the scar tissue being divided into respective layers, and to select which of the layers are displayed. This provides a visual effect of "peeling" layers of scar away or adding layers of scar tissue to a displayed representation. This provides the user with a relatively easy assessment of the scar position, burden, and transmurality.

The present invention provides an advantage in not projecting to a 2D plane, but retaining the layers at their initial locations, thus visualizing the layers in 3D not on a 2D plane with transparency.

The present invention relates to imaging scar tissue within heart myocardium. While JP2015029518A relates to physically very different features: skin, blood vessels, bone, the present invention relates (at least in some embodiments) to arbitrarily-defined subdivisions of a single layer (myocardium). JP2015029518A describes how to represent different tissue types, while the present invention considers a single tissue type, subdivided. In JP2015029518A, the tissue types are defined by the anatomy, whereas in the present invention, the layers are defined by the subdivision used that can be changed dynamically (e.g. number of layers, thickness).

The method of the present invention allows a user to select which of the defined layers of scar tissue are visualized in 3-D and in doing so assists a user in selecting a suitable position for attachment of an electrode for CRT. By doing so, the cumbersome scrolling through 2-D short axis slices is not required. The method of the present invention provides more detailed information than the coarse bull's-eye plot representations such as illustrated in FIGS. 2-5.

BRIEF DESCRIPTION OF THE DRAWINGS

FIG. 5 shows the results of a calculation of transmurality, based on the data of FIG. 3.

DESCRIPTION OF THE PREFERRED EMBODIMENTS

FIGS. 6A-6F show images as displayed to a clinician in an embodiment of the present invention. They are constructed from medical image data representing scar tissue within a myocardium. For example, such data may be acquired by LGE MRI, but may be acquired by alternative methods.

Figure 1:
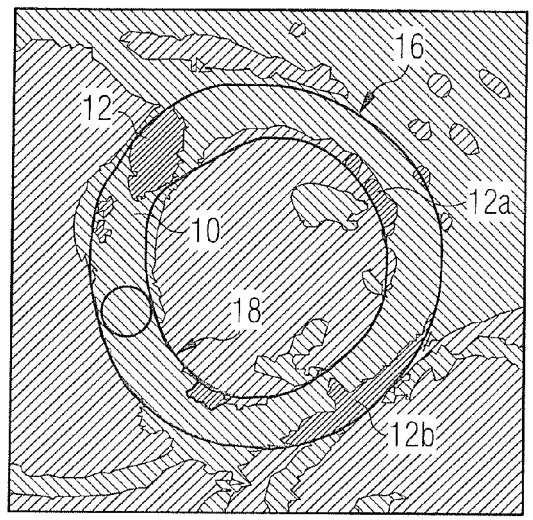
FIG. 1 shows a short-axis view of the left ventricle obtained by MRI.
Figure 2:
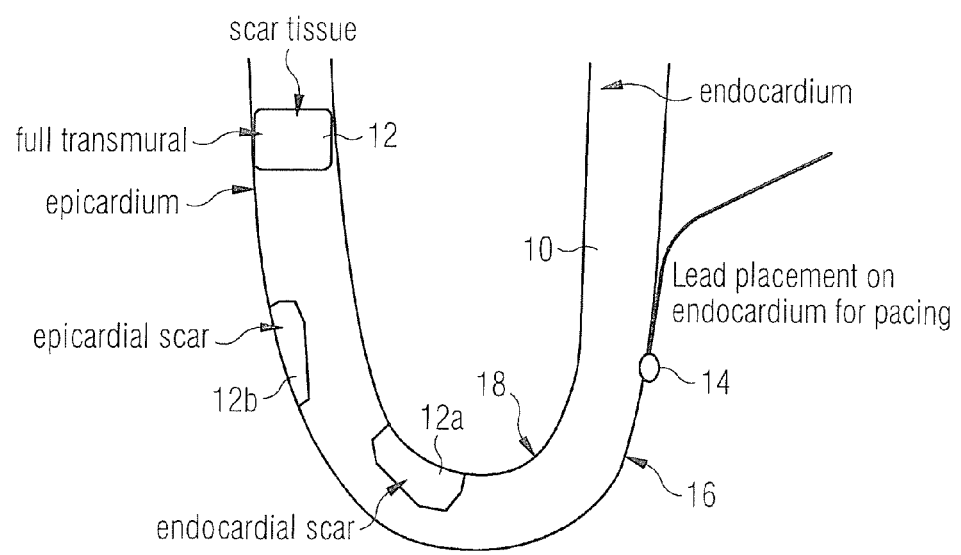
FIG. 2 schematically illustrates a heart wall 10 with regions 12 of scar tissue illustrated.
Figure 3:
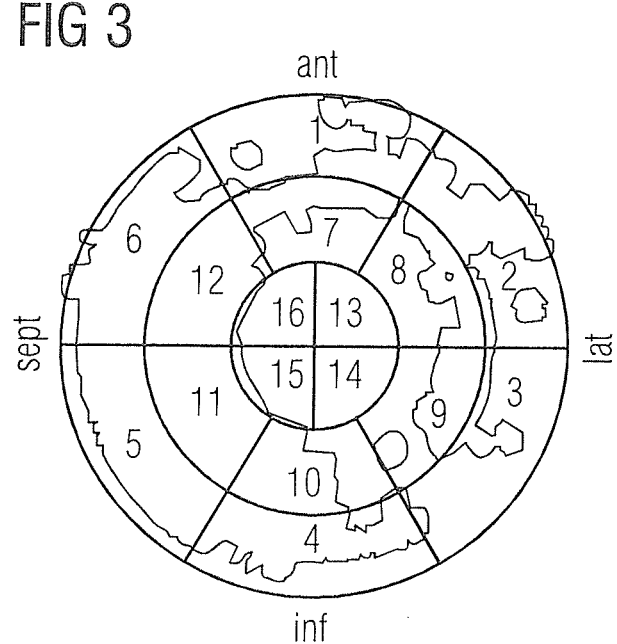
FIG. 3 shows a simple visualization of a bull's-eye plot of scar tissue distribution.
Figure 4:
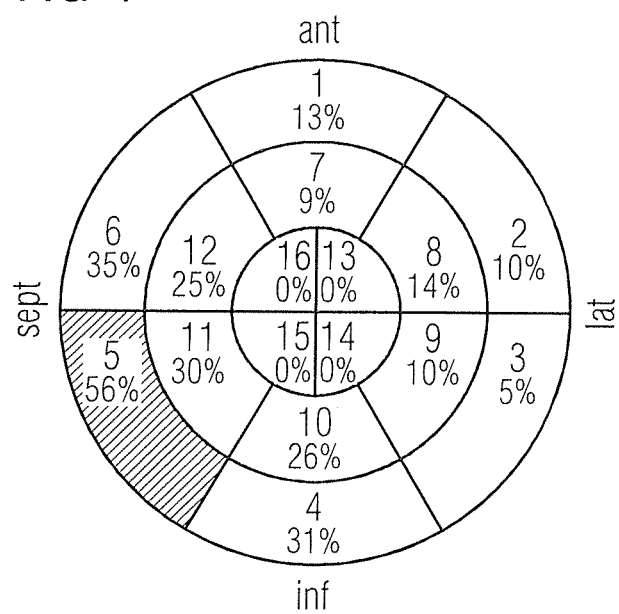
FIG. 4 illustrates automated analysis of the bull's-eye plot of FIG. 3 for "scar burden".
Figure 6A:
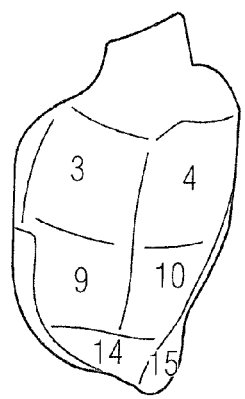
FIGS. 6A-6F show images as displayed to a clinician in an embodiment of the present invention.

FIG. 6A shows an image of the blood pool in the left ventricle of the heart. No representation of the heart wall or of scar tissue is provided. This is a representation of scar tissue according to the present invention wherein the number of displayed layers is zero. Visible regions corresponding to regions in the bulls-eye ploy are labelled.

Figure 6B:
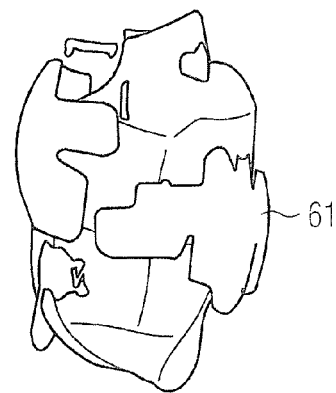

FIG. 6B shows the representation of FIG. 6A with the addition of a representation of in innermost layer 61 of scar tissue. Definition and detection of "layers" of scar tissue will be discussed below. This may represent a representation of scar tissue according to the present invention wherein the number of displayed layers is one.

Figure 6C:
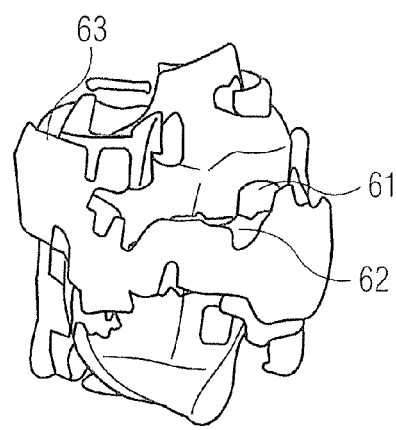

FIG. 6C is a view similar to that of FIG. 6B, but includes representation of a number of layers 61, 62, 63 of scar tissue. Each of the layers is visible separately. This may represent a representation of scar tissue according to the present invention wherein the number of displayed layers is three, for example.

Figure 6D:
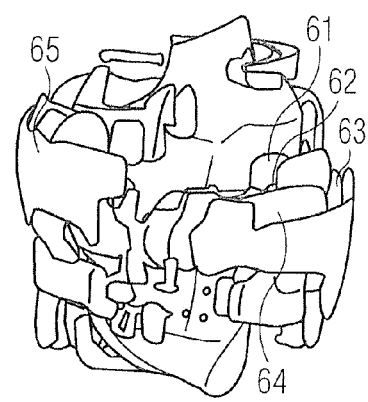

FIG. 6D is a view similar to that of FIG. 6C, but includes representation of a further plurality of layers 61, 62, 63, 64, 65 of scar tissue. Each of the layers is visible separately. This is a representation of scar tissue according to the present invention wherein multiple layers of scar tissue are displayed.

Figure 6E:
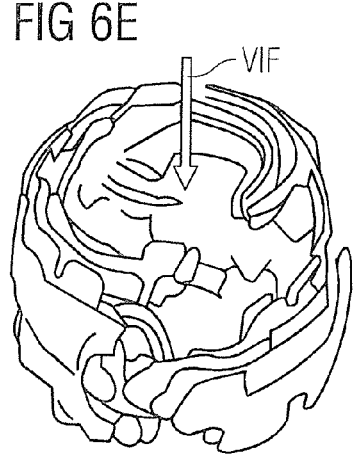

FIG. 6E is a view of a further plurality of layers of scar tissue. Each of the layers is visible separately, but the blood pool represented in FIGS. 6A-6D is not represented in FIG. 6E. As shown, the viewing angle may be adjusted to obtain the best view of the represented layers of scar tissue.

Figure 6F:
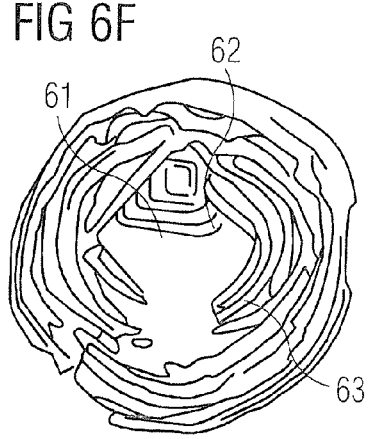

FIG. 6F is a view of the plurality of layers of scar tissue as represented in FIG. 6E, viewed in the direction VIF represented in FIG. 6E.

According to the present invention, a user may activate and deactivate representations of different layers of scar tissue in the views, to investigate the location and extent, and the transmurality, of the scar tissue. One or more views such as illustrated in FIGS. 6A-6F may be presented to the user at any one time.

Of course, scar tissue is not in reality arranged in layers. The present invention provides methods to establish the distribution of scar tissue in layers.

Figure 7:
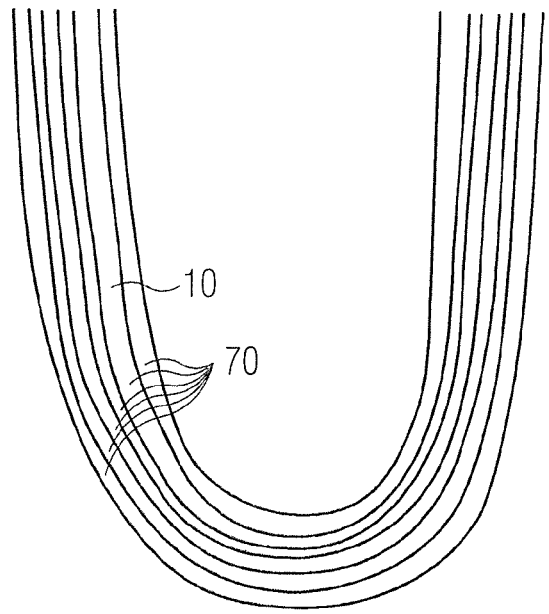
FIG. 7 shows an example of the arrangement of the scar tissue into layers in accordance with the invention.

One example of the arrangement of the scar tissue into layers is shown in FIG. 7. Here, the myocardium 10 is divided into layers 70 of equal thickness, for example 1 mm. This may be achieved by defining the thickness of each layer as a certain number of voxels in the image. The extent of the scar tissue in each of the layers is calculated, and represented in the views of FIGS. 6A-6F. There is a difficulty in such arrangement, though, as the wall of the myocardium is not of constant thickness, so each point of the wall will not include a same number of voxels or layers where each have an equal thickness.

Figure 8:
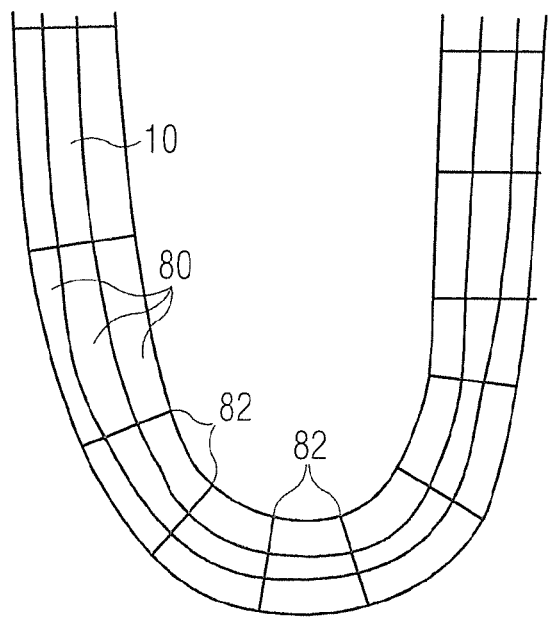
FIG. 8 shows another method in accordance with the invention for dividing the thickness of the wall of the myocardium into layers.

FIG. 8 shows another method for dividing the thickness of the wall of the myocardium 10 into layers 80. Here, the varying thickness 82 of the myocardium—the distance between the epicardium and the endocardium—is divided into a number of layers, in the illustrated example being three layers. At a number of locations 82, the thickness of the myocardium is measured, and divided into the required fractions. The layers are then defined to pass through each of the locations 82 at a depth corresponding to the appropriate fraction. Accordingly, the thickness of each layer will vary at each point, but there will be a same number of layers at each point. In this method of dividing the thickness of the endocardium, each point will be divided into a same number of layers.

Figure 9A:
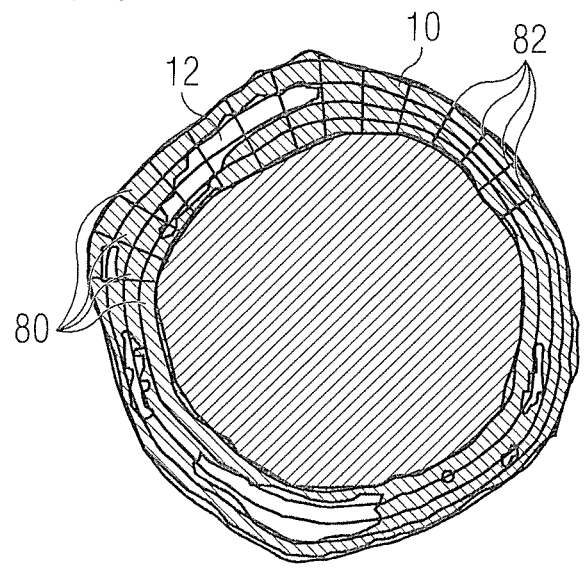
FIGS. 9A and 9B show a short axis plot of the left ventricle, illustrating the blood pool, the endocardium, the myocardium and the epicardium, listed from inside to outside, illustrating the blood pool and the division of the endocardium, and so also the scar tissue, into layers.
Figure 9B:
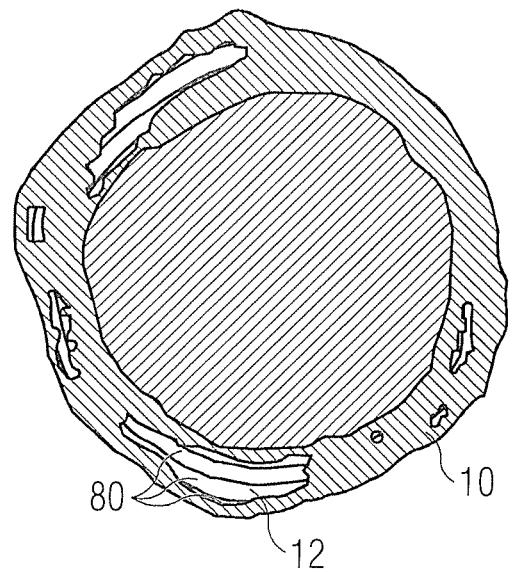

FIGS. 9A and 9B show a short axis plot of the left ventricle, illustrating the blood pool 90, the endocardium 10, the myocardium and the epicardium, listed from inside to outside of FIG. 9. The endocardium is the inner layer of the myocardium. FIGS. 9A and 9B show the division of the myocardium 10 into layers 80. The myocardium extends between the endocardium and the epicardium: the endocardium and the epicardium are the inner and outer layers of the myocardium. In the representation of FIG. 9A, the layers are defined in the manner discussed with reference to FIG. 8.

The thickness of the myocardium is calculated at positions 82, and divided into a required number of layers. The layers 80 are then defined as surfaces passing through each position 82 at the appropriate depth.

In the illustration of FIG. 9B, the layers are represented only within the scar tissue, providing a clearer view of the extent and location of the scar tissue within the illustrated slice.

The present invention accordingly provides a method for representation of the location and transmurality of scar tissue as identified in medical imaging of a heart.

In particular, a wall thickness is divided into a number of layers, and the location of scar tissue in each of those layers is represented. A user may select to view all layers or a selected subset of layers. In that way, a user may determine a transmurality of the scar tissue and identify a suitable location for placement of electrodes.

Although modifications and changes may be suggested by those skilled in the art, it is the intention of the Applicant to embody within the patent warranted hereon all changes and modifications as reasonably and properly come within the scope of the Applicant's contribution to the art.

The invention claimed is:

1. A method for visual representation of scar tissue in medical image data of a heart, comprising:
   providing a computer with medical image data comprising a representation of a heart myocardium and scar tissue within the heart myocardium, the representation of said heart myocardium in said medical image data having a thickness;
   in said computer, dividing said thickness of the representation of the heart myocardium into a plurality of layers;
   in said computer, calculating a presence and distribution of scar tissue within each of said layers;
   at a display in communication with said computer, presenting a visual representation of the calculated presence and distribution of scar tissue in the heart myocardium; and
   via a user interface of said computer, providing user controls that allow a user, via the interface, to select which of said layers of scar tissue is visualized at said display.

2. A method as claimed in claim 1 comprising, in said computer, dividing the representation of the heart myocardium into a plurality of layers of equal thickness, with a number of layers in said plurality of layers of equal thickness being dependent on a uniformity of said thickness, with a higher uniformity resulting in a fewer number of layers and a lower uniformity resulting in a higher number of layers.

3. A method as claimed in claim 1 comprising, in said computer, dividing the representation of the heart myocardium into a plurality of layers having respective layer of thicknesses defined as equal fractions of the thickness of the heart myocardium as represented in said medical image data.

4. A method as claimed in claim 1 comprising providing said computer with image data comprising a representation of the left ventricle, as said heart myocardium, and scar tissue within said left ventricle.

* * * * *